(12) United States Patent
VanBlon et al.

(10) Patent No.: US 10,897,492 B1
(45) Date of Patent: Jan. 19, 2021

(54) DELAYED VOIP PACKET DELIVERY

(71) Applicant: Lenovo (Singapore) Pte. Ltd., Singapore (SG)

(72) Inventors: Russell Speight VanBlon, Raleigh, NC (US); Nathan J. Peterson, Oxford, NC (US); John C. Mese, Cary, NC (US); Arnold S. Weksler, Raleigh, NC (US); Mark Patrick Delaney, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/598,027

(22) Filed: Oct. 10, 2019

(51) Int. Cl.
*H04L 29/06* (2006.01)
*H04L 29/08* (2006.01)
*H04L 12/26* (2006.01)
*H04L 12/883* (2013.01)

(52) U.S. Cl.
CPC ........ *H04L 65/604* (2013.01); *H04L 43/0858* (2013.01); *H04L 49/9021* (2013.01); *H04L 65/80* (2013.01); *H04L 67/306* (2013.01)

(58) Field of Classification Search
CPC ............... H04L 65/604; H04L 43/0858; H04L 49/9021; H04L 65/80; H04L 67/306
See application file for complete search history.

(56) References Cited

U.S. PATENT DOCUMENTS

| | | | |
|---|---|---|---|
| 6,996,626 B1* | 2/2006 | Smith | H04L 29/06027 370/352 |
| 7,668,968 B1* | 2/2010 | Smith | G10L 19/24 709/234 |
| 9,614,977 B1* | 4/2017 | Bond | H04L 65/4015 |
| 2003/0152093 A1* | 8/2003 | Gupta | H04L 65/604 370/412 |
| 2004/0165570 A1* | 8/2004 | Lee | H04M 3/2236 370/349 |
| 2004/0204945 A1* | 10/2004 | Okuda | H04L 65/604 704/500 |
| 2013/0044620 A1* | 2/2013 | Sul | H04L 65/80 370/252 |
| 2013/0235731 A1* | 9/2013 | Hadinata | H04L 41/0659 370/241 |
| 2017/0207988 A1* | 7/2017 | Li | H04L 47/24 |
| 2020/0099732 A1* | 3/2020 | McLeod | H04L 65/604 |

* cited by examiner

*Primary Examiner* — Mohamed A. Wasel
(74) *Attorney, Agent, or Firm* — VanLeeuwen & VanLeeuwen; Jason A. Friday (57) ABSTRACT

An approach is provided that a number of incoming packets over a computer network. The packets are part of a Voice over Internet Protocol (VoIP) session and correspond to vocalizations spoken by a sender during the session. At least one of the packets is received out of order from the order the packets were sent by the sender. Based on a delay encountered during the receiving of the incoming packets, the approach increases a playback speed. The set of packets are then used to audibly play an analog rendition of the vocalizations to the receiving user at the increased playback speed.

20 Claims, 6 Drawing Sheets

FIG. 6

DELAYED VOIP PACKET DELIVERY

BACKGROUND

Voice Over Internet Protocol (VoIP) is a popular communication option due to its versatility, control and cost saving features. One challenge faced by VoIP communications is the reliance on server connectivity and Internet bandwidth for successful voice transmissions. Usually bandwidth issues result in brief dead spots in the conversation, sometimes described as a "stutter" or a "staccato" sound in the audio. Existing solutions are manual and typically involve users verbally confirming whether or not the packets have been delivered (i.e. "Can you hear me?", "Am I breaking up?", "Are you still there?", etc.) Other solutions are reactive such as terminating programs that are consuming bandwidth or resetting the user's network connection, resulting in the user having to restart the VoIP session.

SUMMARY

An approach is provided that a number of incoming packets over a computer network. The packets are part of a Voice over Internet Protocol (VoIP) session and correspond to vocalizations spoken by a sender during the session. At least one of the packets is received out of order from the order the packets were sent by the sender. Based on a delay encountered during the receiving of the incoming packets, the approach increases a playback speed. The set of packets are then used to audibly play an analog rendition of the vocalizations to the receiving user at the increased playback speed.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

The figures show an approach that delays VoIP packet delivery to a user in order to improve the quality of the VoIP audio by reducing or removing "stutter" or a "staccato" sounds in the resulting VoIP audio due to "dead spots" encountered in the VoIP packet delivery.

The core novelty of this approach is the recognition of segmented packets within a VoIP transmission and consolidating those packets for an improved transmission and user experience. Suppose User "A" speaks into VoIP device (e.g., microphone, VoIP telephone handset microphone, etc.) to one or more other users. Data is transmitted via a Transmission Control Protocol (TCP) or other lossless mechanism. This data delivery might be impacted by poor connectivity and/or bandwidth causing anticipated delivery of choppy packets. User "A" and the other users are notified of the impacted packet delivery, such as by an audible tone. Packets are placed in order, waiting for older packets to arrive before playing previous packets (as done by TCP VoIP today). Packets are delivered in form that was originally intended and transmitted by User "A." However, unlike traditional VoIP audio playback, playback speed is increased based on the delay encountered during packet reception.

Once a full set of packets are received, audio playback speed is increased to account for the delay encountered during packet reception. In one embodiment, a delay threshold is used to determine rate of audio playback. If audio is far behind, audio playback is increased more. Likewise, if audio packet delay is relatively small, then the audio playback is increased to a lesser extent.

This approach is not limited to two-way conversations and can be expanded to multi-user embodiments. The system prompt that notifies the users that delays have been encountered and audio playback speed is being adjusted can be an audible signal, a vibration, a "beep," a voice prompt, etc. It can also be conveyed on one line or to multiple lines. The user is notified when this playback speed up service is activated and, in one embodiment, the user can manual toggle the threshold of activation.

For example, the phrase "The dog is running" might be sent over the network in a VoIP session using 20 different network packets. These packets are sent by the sender (speaker) for a portion of audio that might only last a few seconds. In the example, the recipient is "missing" packets #1 and #10, but receives the other 18 packets. The recipient's device requests packets #1 #10 a second time after discovering they are missing (after waiting for a period of time). The recipient then receives packets #1 and #10 after the other packets were already received. The transmission and resending of packets this is how traditional TCP VoIP operates today. In the approach described herein, since the recipient is behind on audio, the approach expedites the delivery of the audio to "catch up" faster by playing the audio back faster than originally spoken with the amount of speed up depending on how much packet delay is encountered. For example, if only a second behind, the approach may increase playback speed by a small amount (e.g., 10% increase, etc.). If a few seconds delayed, the playback speed increase amount will be somewhat greater (e.g., 25% increase), while if delayed by several seconds, the playback speed might be increased to the maximum amount that can be understood by the user (e.g., 50% faster, etc).

The approach does not wait for a full sentences (or words) to arrive in packets. Instead, the approach waits for packets of audio that arrive after other sequential audio packets, while we deferring playback until missing packets are received. However, unlike traditional approaches, the instant approach "speeds up" the audio playback of the packets so that "stutter" or "staccato" sounds in the audio playback are reduced or eliminated.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
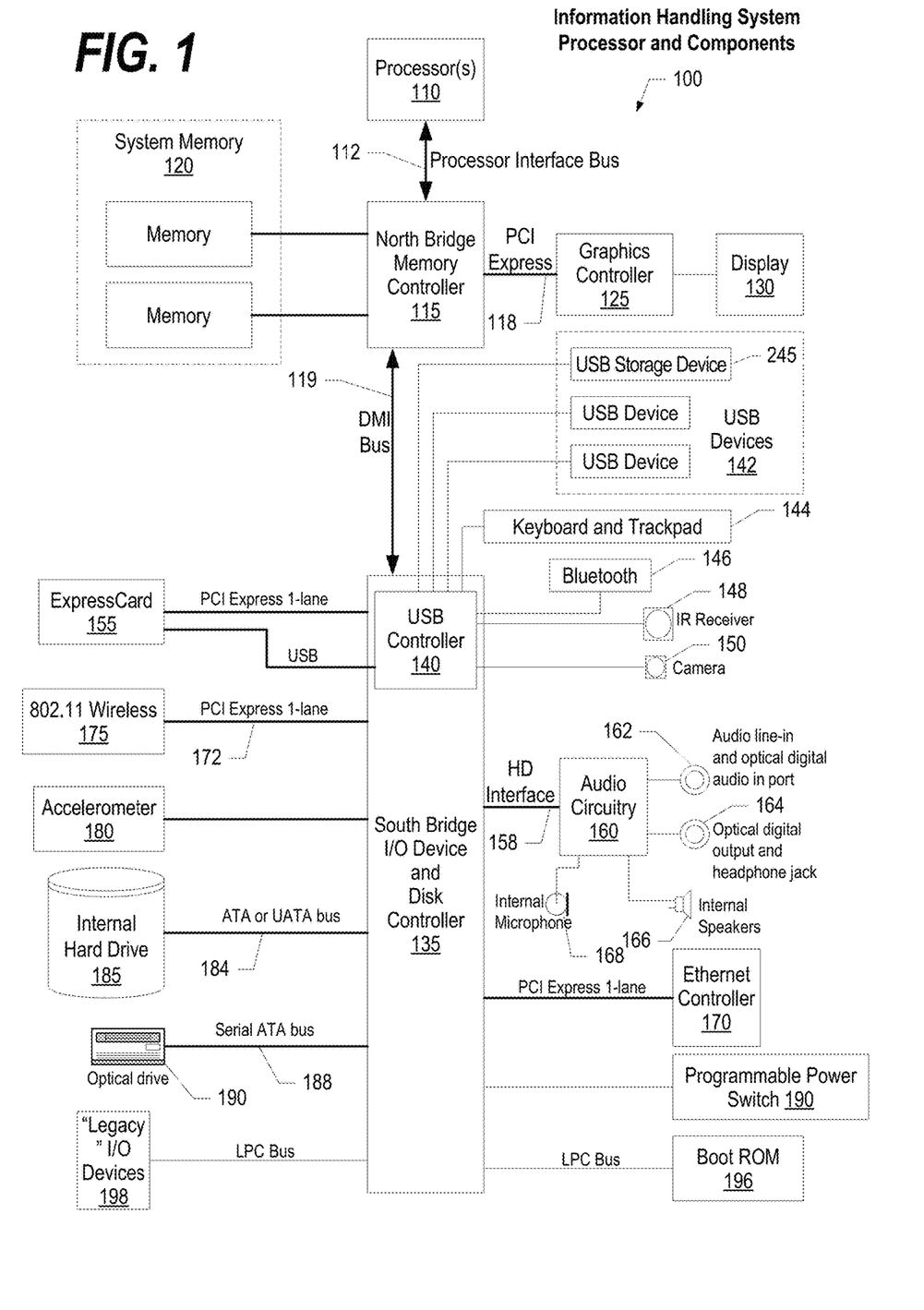
FIG. 1 is a block diagram of a data processing system in which the methods described herein can be implemented.
Figure 2:
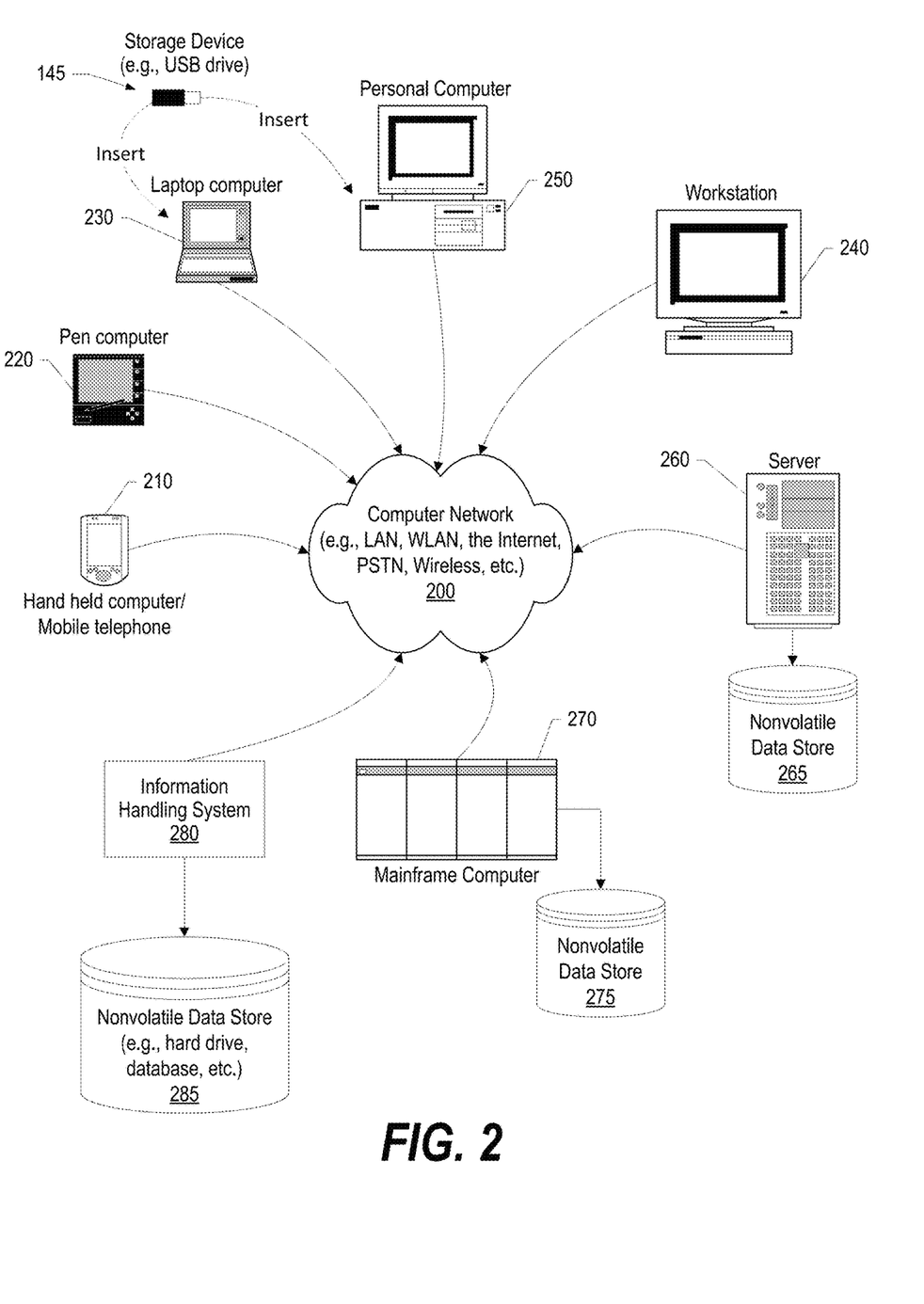
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
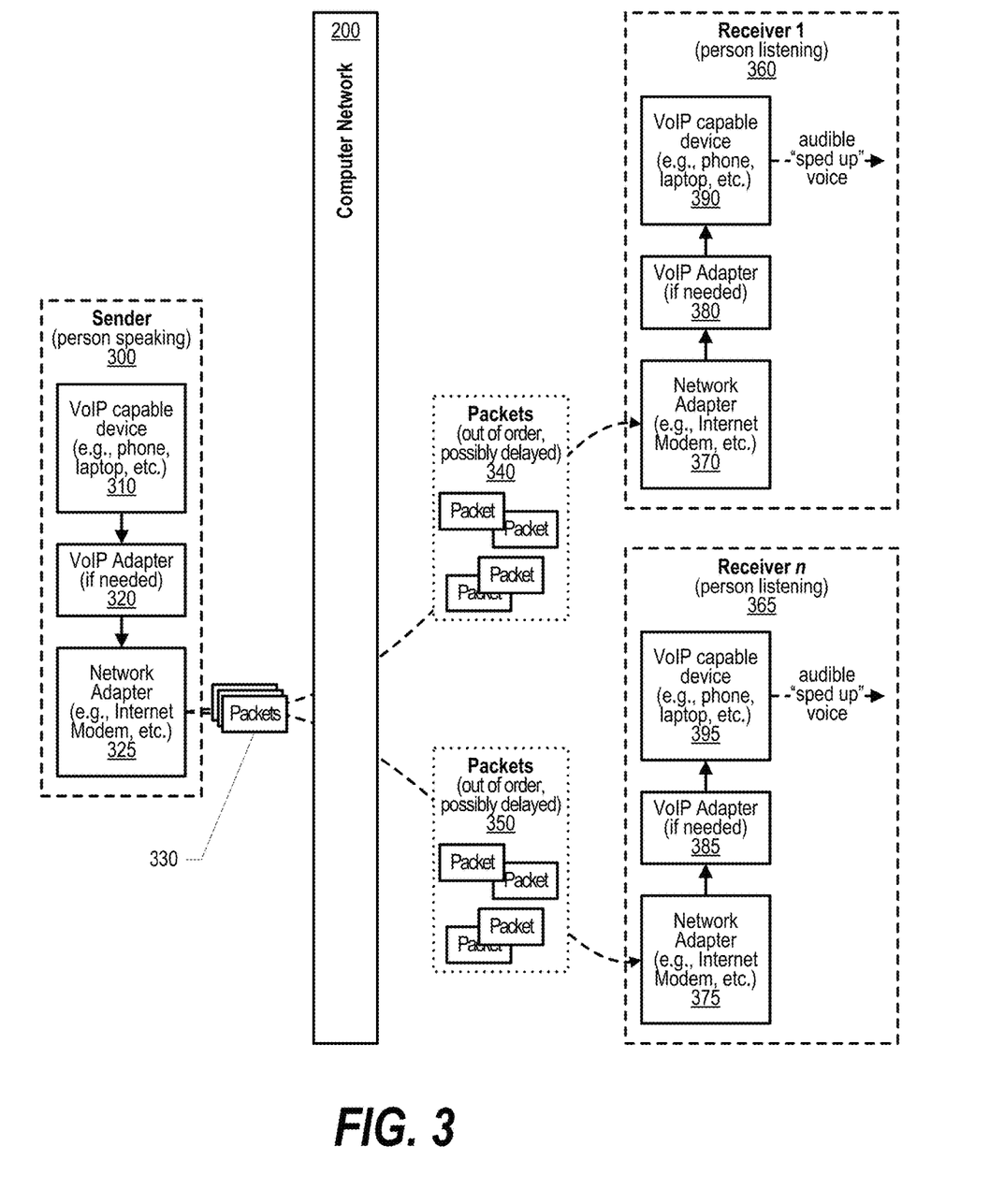
FIG. 3 is a component diagram depicting the components used in a system that provides delayed VoIP packet delivery.

FIG. 3 is a component diagram depicting the components used in a system that provides delayed Voice over Internet Protocol (VoIP) packet delivery. Sender 300 is the person who is speaking and whose vocalizations are being transmitted to one or more receivers, depicted as receivers 360 and 365. Sender speaks into VoIP capable device 310, such as a telephone, microphone attached to a computer system, or the like. In some setups, those where VoIP device 310 does not convert the sender's analog voice signals into digital data, a separate VoIP adapter 320 is utilized to convert the analog voice signals into digital IP packets for transport over an IP network, such as the Internet. The VoIP adapter can also receive digital packets and convert the digital packet data into analog voice signals. Finally, network adapter 325, such as a modem, transmits digital packets 330 converted from the sender's analog voice signals over computer network 200 to receivers 360 and 365.

Due to many network issues and the way the various packets are routed between sender 300 and receivers 360 and 365, the set of packets may arrive in a different order than they were originally sent. In addition, some of the packets in the set might be delayed or lost and have to be retransmitted from the sender to the receivers. The out of order packets arriving at receivers 360 and 365 are depicted as incoming packets 340 and 350, respectively. The incoming packets are received by receiver 360's network adapter 370 and by receiver 365's network adapter 375. The digital packet data are converted from digital data back to the analog voice signals of the sender's vocalizations by VoIP adapters 380 and 385, respectively, or by the receivers' VoIP capable devices, shown as devices 390 and 395, respectively. If incoming packets are delayed, then the receiver's device automatically increases the playback speed to reduce or eliminate choppy playback that can otherwise sound like a "stutter" or a "staccato" if the playback speed is not adjusted.

Figure 4:
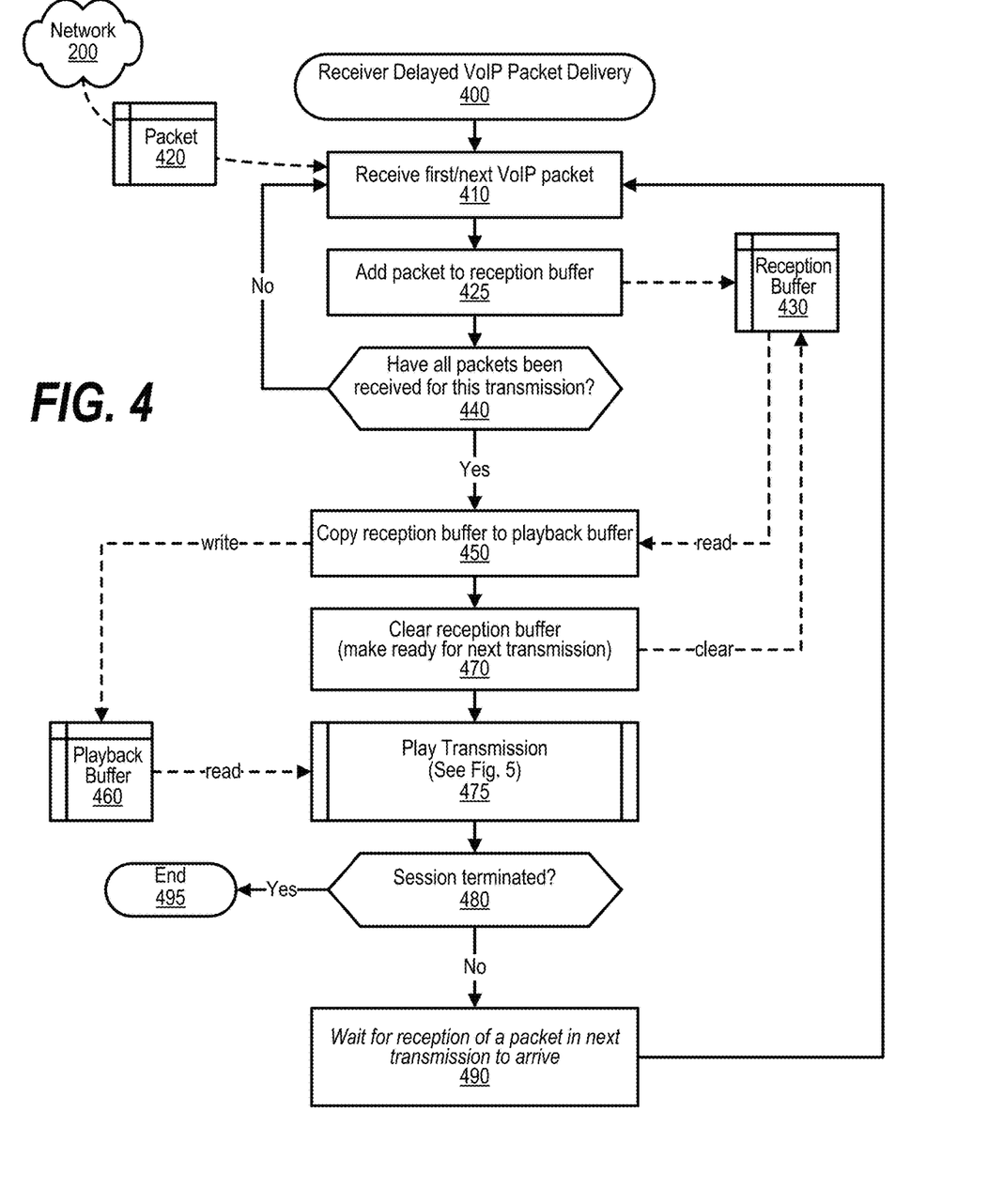
FIG. 4 is a flowchart showing steps taken by a process that receives packets during the VoIP session.

FIG. 4 is a flowchart showing steps taken by a process that receives packets during the VoIP session. FIG. 4 processing commences at 400 and shows the steps taken by a process that delays audible sound delivery when Voice over Internet Protocol (VoIP) packet reception has been delayed. At step 410, the process receives the first VoIP packet that was transmitted by the sender through computer network 200, such as the Internet, and arrives at the receivers system as incoming packet 420. At step 425, the process adds the packet to reception buffer 430. The process determines as to whether all of the packets in the set have been received (decision 440). A set of packets might be a few seconds of audio vocalizations spoken by the sender. If all of the packets have not yet been received, then decision 440 branches to 'no' branch which loops back to step 410 to keep receiving incoming packets from the sender. The incoming packets might be retransmitted packets if the receiver's system determines that an expected packet has been "lost" if the packet does not arrive within a particular time window. This looping continues until all of the packets in the set have been received and stored in buffer 430, at which point decision 440 branches to the 'no' branch exiting the loop.

At step 450, the process copies the data from reception buffer 430 to playback buffer 460. At step 470, the process clears reception buffer 430 to make the reception buffer ready to receive packets for the next set of transmitted packets. At predefined process 475, the process performs the Play Transmission routine (see FIG. 5 and corresponding text for processing details). This routine determines whether to increase the playback speed if the incoming packets were delayed during transmission. The process determines as to whether the VoIP session has been terminated (decision 480).

If the VoIP session has not yet been terminated, then decision 480 branches to the 'no' branch which, at step 490, waits for the next set of packets to begin being received by the receiver, at which point processing loops back to step 410 to receive the next set of incoming packets as described above. This looping continues until the VoIP session is terminated, at which point decision 480 branches to the 'yes' branch exiting the loop with the processing shown in FIG. 4 terminating at 495.

Figure 5:
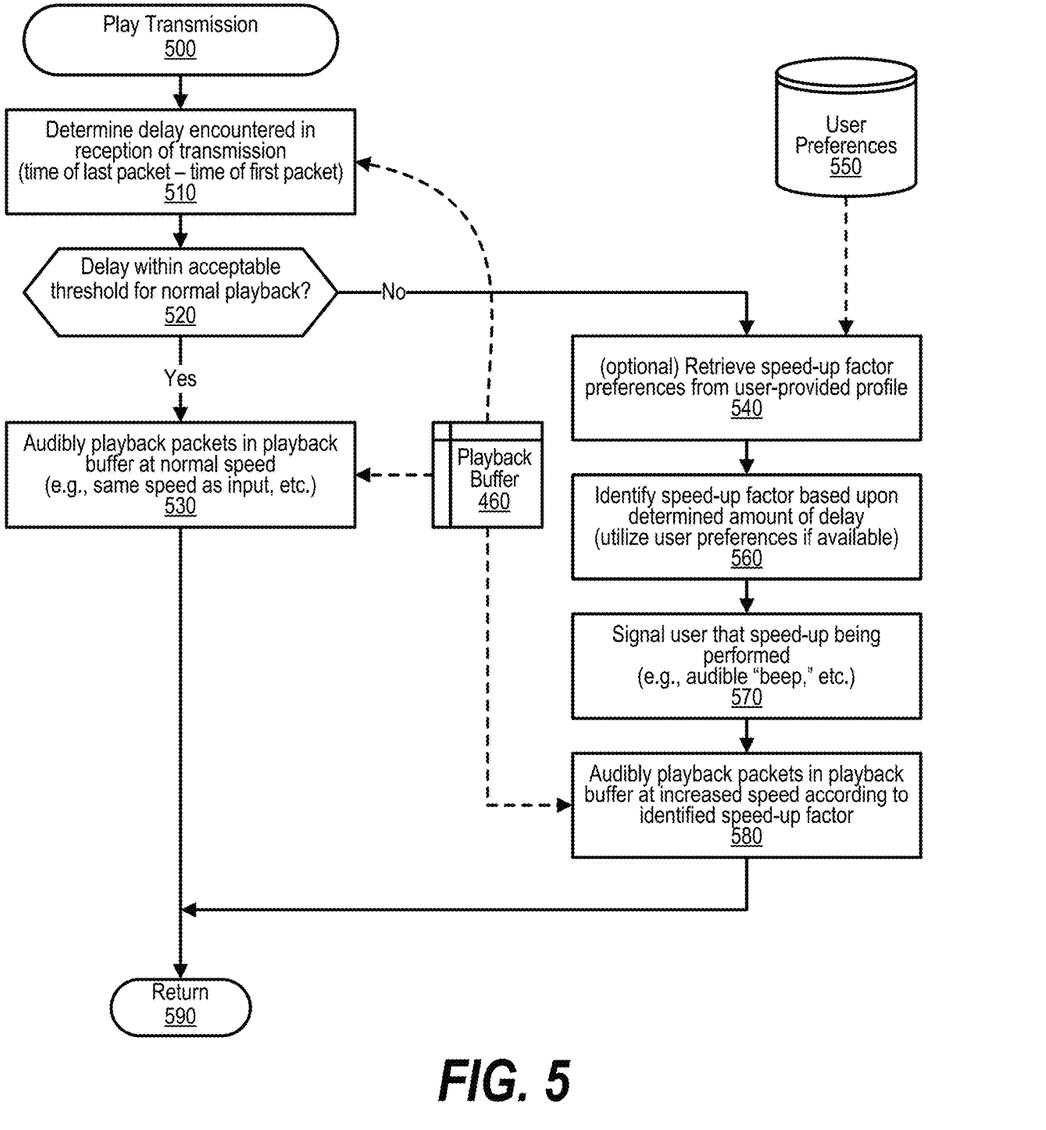
FIG. 5 is a flowchart showing steps taken by a process that plays the audio encoded in the received packets in a delayed fashion.

FIG. 5 is a flowchart showing steps taken by a process that plays the audio encoded in the received packets in a delayed fashion. FIG. 5 processing commences at 500 and shows the steps taken by a process that plays back a set of packets that were transmitted to the receiver at an increased playback speed, if such increased playback speed is deemed necessary. At step 510, the process determines the delay that was encountered in the reception of the incoming packets during the transmission of the set of packets. In one embodiment, the delay is calculated by subtracting the time that the first packet arrived from the time that the last packet arrived with the amount overall amount of time being the amount of time taken for the set of packets to arrive at the receiver's reception buffer.

The process determines as to whether the delay encountered to receive the set of packets is within an acceptable threshold for normal playback (decision 520). For example, the threshold might be a half of a second. If the delay encountered is within an acceptable threshold for normal playback, then decision 520 branches to the 'yes' branch whereupon, at step 530, the process audibly plays back the packets (after converting the digital packet data to analog signals) from playback buffer 460 at normal speed (e.g., the same speed as the sender vocalized the spoken words when creating the input, etc.). On the other hand, if the delay experienced is not within the acceptable threshold for normal playback, then decision 520 branches to the 'no' branch to perform steps 540 through 580 which execute to speed up the playback of the audio encoded in the set of packets stored in playback buffer 460.

Figure 6:
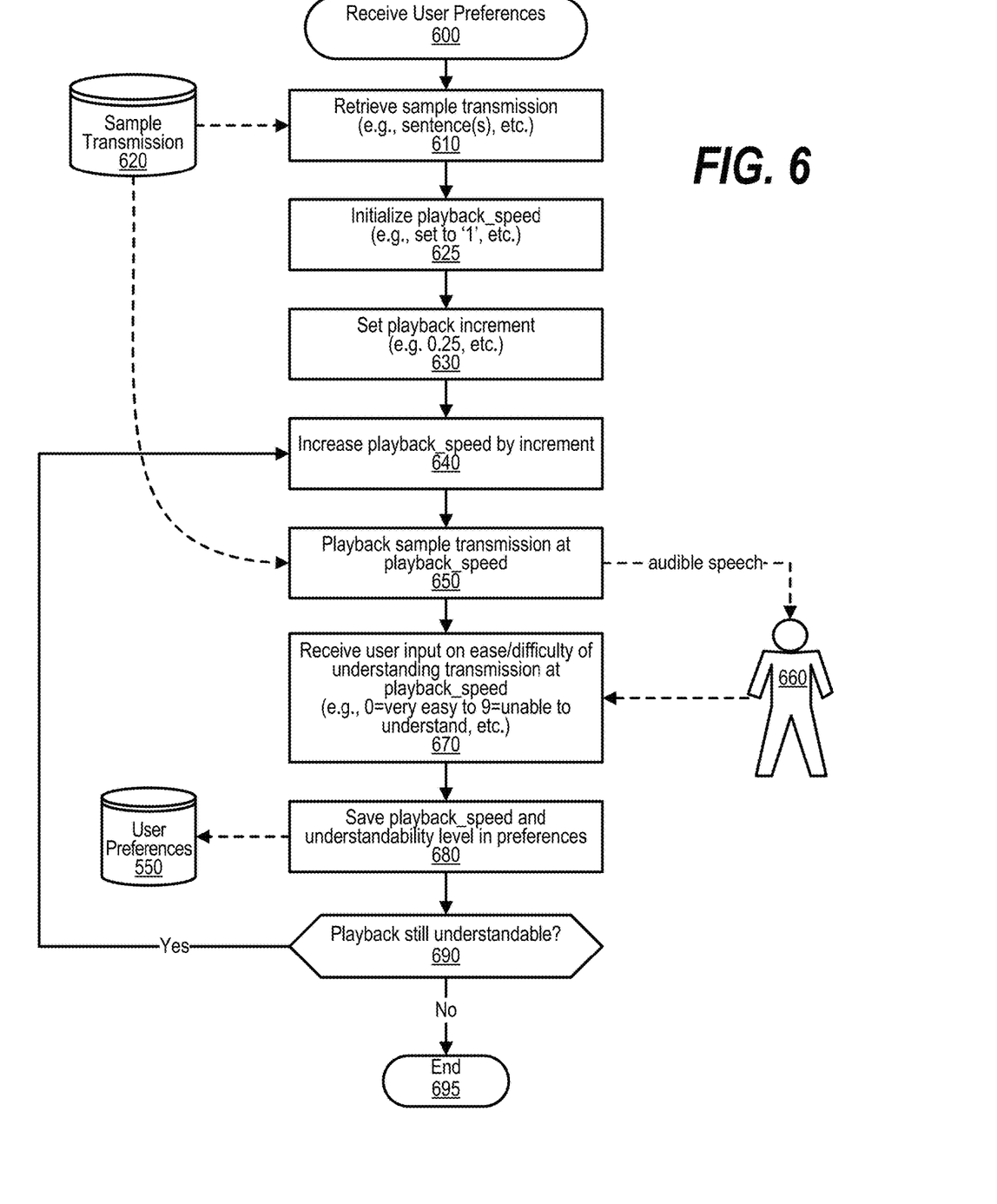
FIG. 6 is a flowchart showing steps taken by a process collects user's preferences regarding playback speed that are utilized when the process plays the audio in a delayed fashion.

At step 540, the process retrieves a speed-up factor preferences from user-provided profile retrieved from data store 550. When used, the preferences are calibrated for the particular receiver so that the playback speed increase is at a rate where the individual user can still readily understand the audio when transmitted at the increased playback speed. FIG. 6 shows the processing used by the receiver to calibrate the playback speed increase to the individual's liking so that the increased playback speed can still be understood by this particular user. At step 560, the process identifies the increased playback speed at which the packet should be transmitted with this increased playback speed being based upon the determined amount of packet delay experienced as well as by the user preferences if the user has calibrated the increased playback speed as shown in FIG. 6. At step 570, the process signals to the user that the playback speed is being increased, such as by an audible "beep," a vibration, or other signal or notification. At step 580, the process audibly plays back the analog signals resulting from converting the digital packets from buffer 460 to such analog signals with the audible transmission speed being increased by the factor identified in step 560. FIG. 5 processing thereafter returns to the calling routine (see FIG. 4) at 590.

FIG. 6 is a flowchart showing steps taken by a process collects user's preferences regarding playback speed that are utilized when the process plays the audio in a delayed fashion. FIG. 6 processing commences at 600 and shows the steps taken by a process that receives user preferences from a user regarding playback speed increase that can be performed during Voice over Internet Protocol (VoIP) sessions when incoming VoIP packets are delayed. At step 610, the process retrieves a sample transmission (e.g., sentence(s), etc.) from data store 620. At step 625, the process initializes playback_speed (e.g., set to '1', etc.). At step 630, the process sets playback increment (e.g. 0.25, etc.). At step 640, the process increases the playback_speed by the increment value.

At step 650, the process plays back the sample transmission at the increased playback_speed (e.g., at 1.25 times the original speed, etc.) and the sample transmission is heard by user 660. At step 670, the process receives an input from user 660 regarding the ease or difficulty the user had of understanding the transmission at the current increased playback_speed. For example, the user might enter '0' meaning "very easy" to '9' meaning "completely unable to understand," etc.

At step 680, the process saves the current playback_speed and the user's understandability level in preferences data store 550. The process determines as to whether the user has indicated that playback is still understandable (e.g., not equal to '9', etc.) by the user (decision 690). If playback is still understandable by the user, then decision 690 branches to the 'yes' branch which loops back to step 640 to further increase the current playback_speed by the increment value. This looping continues until the user indicates that the playback_speed is not understandable, at which point decision 690 branches to the 'no' branch exiting the loop and processing ends at 695.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system comprising a processor, a memory accessible by the processor, and a network interface connecting the information handling system to a computer network, the method comprising:
   receiving, via a computer network, a plurality of incoming packets corresponding to vocalizations spoken by a sender during a Voice over Internet Protocol (VoIP) session, wherein at least one of the plurality of incoming packets is received out of order;
   based on a delay encountered during the receiving of the plurality of incoming packets, increasing a playback speed, wherein the playback speed is increased to a selected predefined user-selected playback speed; and
   audibly playing an analog rendition of the vocalizations at the increased playback speed.

2. The method of claim 1 further comprising:
   audibly signaling that the playback speed has been increased prior to the audibly playing of the analog rendition of the vocalizations.

3. The method of claim 1 further comprising:
   prior to receiving the plurality of packets, receiving, from a user of the information handling system, one or more preferences regarding an ease of understanding by the user of an audible transmission at one or more predefined playback speeds, wherein one of the predefined playback speeds is the selected predefined user-selected playback speed, and wherein the user indicated that the user was able to understand the audible transmission at the selected predefined user-selected playback speed.

4. The method of claim 3 further comprising:
   selecting the selected predefined user-selected playback speed from the one or more predetermined playback speeds based on both the delay encountered and the prior received user preferences.

5. The method of claim 1 further comprising:
   storing the incoming packets in a first buffer, wherein incoming packets are a set of packets that represent an amount of time taken by the sender to send the vocalizations, and wherein the delay encountered is determined based on an amount of time taken to receive and store all of the set of packets in the first buffer.

6. The method of claim 5 further comprising:
   comparing the amount of time taken to receive and store all of the set of packets to a threshold, wherein the playback speed is increased based on the threshold.

7. The method of claim 5 further comprising:
   increasing the playback speed a first amount in response to the amount of time taken indicating a minor delay in receiving all of the set of packets; and
   increasing the playback speed a second amount in response to the amount of time indicating a greater than the minor delay in receiving all of the set of packets, wherein the first amount is less than the second amount.

8. An information handling system comprising:
   one or more processors;
   a memory coupled to at least one of the processors;
   a network interface that connects the information handling system to a computer network; and
   a set of computer program instructions stored in the memory and executed by at least one of the processors in order to perform actions comprising:
   receiving, via a computer network, a plurality of incoming packets corresponding to vocalizations spoken by a sender during a Voice over Internet Protocol (VoIP) session, wherein at least one of the plurality of incoming packets is received out of order;
   based on a delay encountered during the receiving of the plurality of incoming packets, increasing a playback speed, wherein the playback speed is increased to a selected predefined user-selected playback speed; and
   audibly playing an analog rendition of the vocalizations at the increased playback speed.

9. The information handling system of claim 8 wherein the actions further comprise:
   audibly signaling that the playback speed has been increased prior to the audibly playing of the analog rendition of the vocalizations.

10. The information handling system of claim 8 wherein the actions further comprise:

prior to receiving the plurality of packets, receiving, from a user of the information handling system, one or more preferences regarding an ease of understanding by the user of an audible transmission at one or more predefined playback speeds, wherein one of the predefined playback speeds is the selected predefined user-selected playback speed, and wherein the user indicated that the user was able to understand the audible transmission at the selected predefined user-selected playback speed.

11. The information handling system of claim 10 wherein the actions further comprise:
selecting the selected predefined user-selected playback speed from the one or more predetermined playback speeds based on both the delay encountered and the prior received user preferences.

12. The information handling system of claim 8 wherein the actions further comprise:
storing the incoming packets in a first buffer, wherein incoming packets are a set of packets that represent an amount of time taken by the sender to send the vocalizations, and wherein the delay encountered is determined based on an amount of time taken to receive and store all of the set of packets in the first buffer.

13. The information handling system of claim 12 wherein the actions further comprise:
comparing the amount of time taken to receive and store all of the set of packets to a threshold, wherein the playback speed is increased based on the threshold.

14. The information handling system of claim 12 wherein the actions further comprise:
increasing the playback speed a first amount in response to the amount of time taken indicating a minor delay in receiving all of the set of packets; and
increasing the playback speed a second amount in response to the amount of time indicating a greater than the minor delay in receiving all of the set of packets, wherein the first amount is less than the second amount.

15. A computer program product comprising:
a computer readable storage medium, comprising computer program code that, when executed by an information handling system, executes a digital assistant that performs actions comprising:
receiving, via a computer network, a plurality of incoming packets corresponding to vocalizations spoken by a sender during a Voice over Internet Protocol (VoIP) session, wherein at least one of the plurality of incoming packets is received out of order;
based on a delay encountered during the receiving of the plurality of incoming packets, increasing a playback speed, wherein the playback speed is increased to a selected predefined user-selected playback speed; and
audibly playing an analog rendition of the vocalizations at the increased playback speed.

16. The computer program product of claim 15 wherein the actions further comprise:
audibly signaling that the playback speed has been increased prior to the audibly playing of the analog rendition of the vocalizations.

17. The computer program product of claim 15 wherein the actions further comprise:
prior to receiving the plurality of packets, receiving, from a user of the information handling system, one or more preferences regarding an ease of understanding by the user of an audible transmission at one or more predefined playback speeds, wherein one of the predefined playback speeds is the selected predefined user-selected playback speed, and wherein the user indicated that the user was able to understand the audible transmission at the selected predefined user-selected playback speed.

18. The computer program product of claim 17 wherein the actions further comprise:
selecting the selected predefined user-selected playback speed from the one or more predetermined playback speeds based on both the delay encountered and the prior received user preferences.

19. The computer program product of claim 15 wherein the actions further comprise:
storing the incoming packets in a first buffer, wherein incoming packets are a set of packets that represent an amount of time taken by the sender to send the vocalizations, and wherein the delay encountered is determined based on an amount of time taken to receive and store all of the set of packets in the first buffer.

20. The computer program product of claim 19 wherein the actions further comprise:
increasing the playback speed a first amount in response to the amount of time taken indicating a minor delay in receiving all of the set of packets; and
increasing the playback speed a second amount in response to the amount of time indicating a greater than the minor delay in receiving all of the set of packets, wherein the first amount is less than the second amount.

\* \* \* \* \*